United States Patent

[11] 3,629,538

[72] Inventor Masataka Suzuki
Shizuoka, Japan

[21] Appl. No. 81,404
[22] Filed Oct. 16, 1970
[45] Patented Dec. 21, 1971
[73] Assignee Mitsubishi Denki Kabushiki Kaisha
Tokyo, Japan
[32] Priority Oct. 23, 1969
[33] Japan
[31] 44/100838

[54] MAGNETRON MOUNTING DEVICE IN AN ELECTRONIC RANGE
3 Claims, 4 Drawing Figs.

[52] U.S. Cl. .......... 219/10.55, 174/35 TS, 339/144
[51] Int. Cl. .......... H05b 9/06
[50] Field of Search .......... 219/10.55; 292/256, 256.63; 174/35 TS; 339/144

[56] References Cited

UNITED STATES PATENTS

| | | | |
|---|---|---|---|
| 2,770,787 | 11/1956 | Peters | 174/35 TS |
| 2,862,991 | 12/1958 | Reardon | 174/35 TS |
| 2,911,458 | 11/1959 | McKee | 174/35 TS |

*Primary Examiner*—J. V. Truhe
*Assistant Examiner*—Hugh D. Jaeger
*Attorneys*—Robert E. Burns and Emmanuel J. Lobato

ABSTRACT: In an electronic range, in order to prevent the leakage of electromagnetic waves through the opening provided on the baseplate of the range for inserting the antenna projecting from the magnetron, the baseplate is shaped to have a special shape in the neighborhood of the opening so that the electromagnetic waves are prevented from their leaking out from the neck of the magnetron.

PATENTED DEC 21 1971 3,629,538

MAGNETRON MOUNTING DEVICE IN AN ELECTRONIC RANGE

BACKGROUND OF THE INVENTION

This invention relates to an electronic range, and more particularly to a magnetron-mounting device in an electronic range. Generally, in an electronic range, the baseplate of the range is required to be formed to have an opening to insert the antenna projecting from the magnetron into the range. It is a matter of course that electromagnetic wave leakage preventing means such as wire-net gaskets, etc., are provided around the opening to prevent the leakage of the electromagnetic waves.

In a conventional electronic range, it is usual that, when a magnetron is to be mounted on its baseplate, as shown in FIG. 1, an upstanding flange 5 adapted to come into contact with a wire-net gasket 2 which has been previously fitted at the neck of a magnetron 1 is provided on the flat surface of the baseplate 7 of the range so that the electrical contact between the magnetron 1 and the baseplate 7 is maintained. However, it is impossible to establish a perfect sealing against the leakage of the electromagnetic waves between the baseplate 7 and the yoke of the magnetron 1 over their entire contacting surfaces, so that there is the danger of the electromagnetic wave leakage through the gaps between them, because it is very difficult to obtain sufficiently soft wire-net gaskets and also it is impossible to make the surface of the flange which comes into contact with the gasket be a uniform flat surface.

SUMMARY OF THE INVENTION

It is an object of the present invention to provide a magnetron-mounting device in an electronic range which overcomes the disadvantages inherent to the conventional mounting device of a magnetron on an electronic range with simple construction and without the leakage of electromagnetic waves.

A further object of the present invention is to provide a magnetron-mounting device in an electronic range in which the upstanding flange to be equipped around the opening for inserting the antenna projecting from the magnetron as well as to come into contact with the neck of the magnetron is made so as to be resilient constitution so that the electromagnetic waves do not leak out through the contacting portions of the magnetron with its mounting baseplate of the electronic range.

Another object of the present invention is to provide a magnetron-mounting device in an electronic range in which an annular groove having a V-shaped cross section formed from the mounting baseplate of the range is provided between the upstanding flange and the baseplate so that the groove is enclosed with the magnetron yoke to form a hollow cave when the magnetron is fixed to the baseplate, thereby the leaking electromagnetic waves are attenuated in this hollow cave.

BRIEF DESCRIPTION OF THE DRAWING

These and other objects of the present invention will become more apparent to those skilled in the art when considered in reference to the following detailed description in the light of the accompanying drawings in which like numerals indicate like parts throughout the figures thereof, and wherein.

DESCRIPTION OF THE PREFERRED EMBODIMENTS

Figure 1:
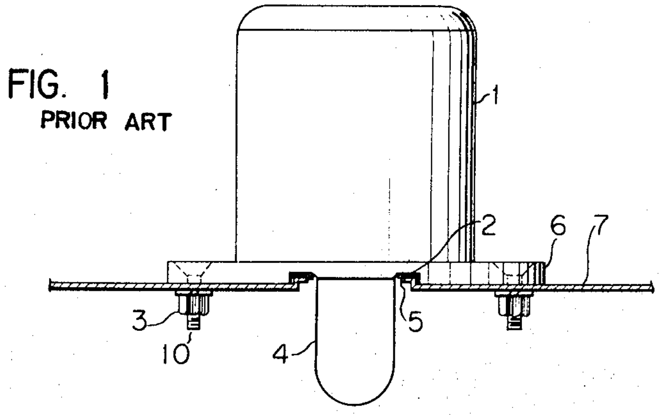
FIG. 1 PRIOR ART
FIG. 1 is an elevational, sectional view of a magnetron-mounting portion in an electronic range in accordance with the teachings of the prior art.
Figure 2:
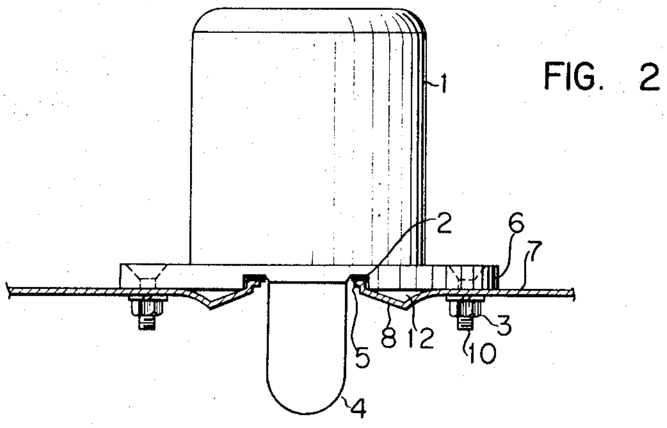
FIG. 2 is an elevational, sectional view of a magnetron-mounting portion in an electronic range in accordance with the preferred embodiment of the present invention.
Figure 3:
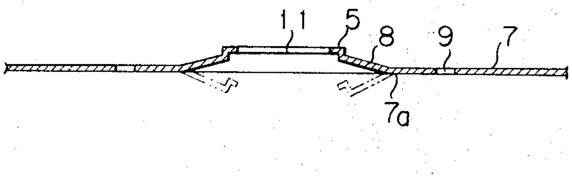
FIG. 3 is an elevational, sectional view of the upper baseplate of the range shown in FIG. 2 with the removal of the magnetron.

Referring to FIGS. 2 and 3 showing an embodiment of the present invention, 1 shows a magnetron, and 2 a wire-net gasket to improve the contact between the upstanding flange 5 provided on the upper baseplate 7 of an electronic range or electronic cooking stove and the yoke 6 of the magnetron 1, whereby the gasket 2 is fitted into an annular groove formed in the yoke 6 of the magnetron 1. Numeral 3 indicates nuts for securing the magnetron 1 to the range upper baseplate 7 which are screwed on the machine screws 10 fastened to the yoke 6. Numeral 4 shows the antenna projecting from the magnetron 1 which is inserted into the range through an opening 11 to be secured to the range upper baseplate 7 so that it radiates the electromagnetic waves. Numeral 8 shows a conically inclined surface provided around the upstanding flange 5, and 9 indicates holes for passing through the machine screws 10.

FIG. 3 shows the state of the flange 5 before the magnetron 1 is secured thereto. In this state, the magnetron 1 is rested on the range upper baseplate 7 being in the state as shown in FIG. 3 with the antenna 4 and the screws 10 being introduced through the opening 11 and the holes 9 respectively. When the nuts 3 are thereafter screwed on the machine screws 10 to fasten the magnetron 1 to the range upper baseplate 7, the conically inclined surface 8 initially projecting upwardly is pressed against the wire-net gasket 2 through the upstanding flange 5 so that the midportion 7*a* between the holes 9 and the inclined surface 8 of the range upper baseplate 7 is deformed by an amount corresponding to the height of the inclined surface 8 as shown in FIG. 2. At this point, if considered from the viewpoint of dynamics, since the inclined surface 8 disperses and transmits the force that the upper baseplate 7 of the range has received, even though the upstanding flange 5 be subjected to a biased force, the flatness of the flange 5 will be maintained. Further, since the inclined surface 8 is of a bracelike shape, even though it be strongly pressed down, it is not easily deformed so that the flange 5 bites sufficiently at the wire-net gasket 2. In addition, since the midportion 7*a* between the holes 9 and the inclined surface 8 is a plane, it absorbs the force transmitted thereto to resiliently deform it, thereby the inclined surface 8 is prevented from its being buckled as shown by the dot-dash line in FIG. 3.

Accordingly, in the state that the magnetron 1 is finally fixed to the mounting baseplate 7 of such as the range or a waveguide, etc., an annular groove 12 formed by the inclined surface 8 and the buckled midportion 7*a* is enclosed by the yoke or baseplate 6 of the magnetron 1 to form a hollow case. Since this cave surrounds entirely the antenna-inserting opening 11, even though there exists a leakage of the electromagnetic waves through the portions of the wire-net gasket 2, they are attenuated in the cave so that they do not leak out.

Figure 4:
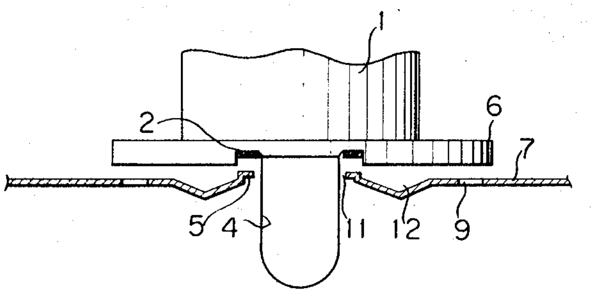
FIG. 4 is an elevational, sectional view of an alternative embodiment of the present invention.

Referring now FIG. 4 showing an alternative of the embodiment of the present invention, an annular groove 12 having a V-shaped cross section is previously provided in the mounting baseplate 7 around its antenna-inserting opening 11, so that, when the magnetron 1 is rested on the baseplate 7, its yoke or baseplate 6 encloses the annular groove 12, thereby the same leakage preventing effect as that obtainable by the device shown in FIGS. 2 and 3 can be given. It will be appreciated that, in this embodiment, since the mounting baseplate 7 is given no elasticity, it is somewhat weaker in rigidity than the first embodiment, but its exhibits a sufficient effect in preventing the electromagnetic wave leakage.

Since the device according to the present invention is constituted as stated above, even though the wire-net gasket 2 provided at the neck of the magnetron 1 is harder than required or has unevenness to some extent in its thickness, since the upstanding flange 5 is supported stiffly by the inclined surface 8 and the midportion 7*a* absorbs the stress applied to prevent the inclined surface 8 from its being buckled, the wire-net gasket 2 shows always a good seal against the electromagnetic wave leakage. In addition, the device according to the present invention requires no extra material. Instead it is also advantageous in that the thickness of the baseplate of the range can be made thin so that the cost of the range becomes to be reduced.

While the invention has been shown and described with reference to preferred embodiments thereof it will be apparent that other changes and modifications can be made in the present invention and therefore it is understood that all changes, equivalents, and modifications within the spirit and scope of the present invention are here meant to be included in the appended claims.

What is claimed is:

1. A magnetron-mounting device in an electronic range, comprising a magnetron-mounting baseplate of the electronic range made of elastic metalic material, said baseplate being formed integrally with an upstanding flange provided around an opening formed in the baseplate of the range for inserting the antenna projecting from the magnetron, a conically inclined surface formed around said flange in the upward direction and a flat surface portion arranged between the skirt of said conically inclined surface and holes disposed outside said conically inclined surface for fixing said magnetron, whereby the magnetron is rested on said magnetron-mounting baseplate to be fixed thereto so that the pressing down force applied to said conically inclined surface from above is absorbed by the restoring force generated in said conically inclined surface as well as said flat surface position, thereby an annular wire-net gasket provided at the neck of said magnetron is forced to press against said upstanding flange.

2. A magnetron-mounting device in an electronic range as claimed in claim 1, in which said conically inclined surface being depressed by the force applied thereto from above and said flat surface portion being bent downwardly by the force applied thereto from above form together an annular groove having a V-shaped cross section, whereby said annular groove forms a cave when it is enclosed by the yoke of said magnetron so that the electromagnetic waves leaking out through the neck of said magnetron are led into said cave.

3. A magnetron-mounting device in an electronic range, comprising a magnetron-mounting baseplate of the electronic range made of metal material, said baseplate being formed integrally with an upstanding flange provided around an opening formed on the baseplate of the range for inserting the antenna projecting from the magnetron and an annular groove having a V-shaped cross section formed between said flange and holes disposed outside the conically inclined surface, of said annular groove for fixing said magnetron, whereby the magnetron is rested on said magnetron-mounting baseplate to enclose said groove by the yoke of said magnetron so that an annular wire-net gasket provided at the neck of said magnetron is forced to press against said upstanding flange, thereby said annular groove and said yoke of said magnetron form together a cave to attenuate the leaking electromagnetic waves.

* * * * *